United States Patent
Choi et al.

(10) Patent No.: US 12,468,628 B2
(45) Date of Patent: Nov. 11, 2025

(54) SYSTEMS AND METHODS FOR SYNCHRONOUS CELL SWITCHING FOR SCALABLE MEMORY

(71) Applicant: Samsung Electronics Co., Ltd., Suwon-si (KR)

(72) Inventors: Byung Hee Choi, Fremont, CA (US); Changho Choi, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/211,131

(22) Filed: Jun. 16, 2023

(65) Prior Publication Data

US 2024/0378149 A1 Nov. 14, 2024

Related U.S. Application Data

(60) Provisional application No. 63/465,794, filed on May 11, 2023.

(51) Int. Cl.
*G06F 12/0815* (2016.01)

(52) U.S. Cl.
CPC .. *G06F 12/0815* (2013.01); *G06F 2212/1024* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 5,539,696 A * 7/1996 Patel .................... G11C 7/1018
　　　　　　　　　　　　　　　　　　365/189.16
5,909,701 A * 6/1999 Jeddeloh .................. G11C 7/22
　　　　　　　　　　　　　　　　　　365/194
(Continued)

FOREIGN PATENT DOCUMENTS

CN　　　112737724 B　　9/2022
CN　　　117827548 A　　4/2024
(Continued)

OTHER PUBLICATIONS

Machine translation of JP 2010-009628 (Year: 2010).*
(Continued)

*Primary Examiner* — Daniel C. Chappell
(74) *Attorney, Agent, or Firm* — Lewis Roca Rothgerber Christie LLP

(57) ABSTRACT

A system includes: a group of memory resources including a first memory node and a second memory node, the first memory node being connected to the second memory node over a switching fabric; and a synchronous clock source connected to the first memory node and the second memory node, the synchronous clock source to provide a synchronized clock signal to the first memory node and the second memory node to synchronize the first memory node with the second memory node. The first memory node and the second memory node are to encode memory data and decode encoded memory data using the synchronized clock signal.

20 Claims, 7 Drawing Sheets

(58) Field of Classification Search
CPC ....... G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 5,926,838 A * | 7/1999 | Jeddeloh | G11C 7/22 365/194 |
| 5,961,596 A * | 10/1999 | Takubo | G06F 11/3495 709/224 |
| 6,078,623 A * | 6/2000 | Isobe | G06F 1/10 713/400 |
| 7,208,988 B2 * | 4/2007 | Murata | H03L 7/0816 327/148 |
| 8,798,032 B2 * | 8/2014 | Tirkkonen | H04W 56/0015 370/350 |
| 9,261,897 B2 * | 2/2016 | Kim | G06F 1/10 |
| 9,319,030 B2 * | 4/2016 | Gentner | H03K 3/017 |
| 9,940,287 B2 | 4/2018 | Das Sharma | |
| 10,254,987 B2 | 4/2019 | Shrader et al. | |
| 10,372,647 B2 * | 8/2019 | Lovett | G06F 13/4022 |
| 11,025,544 B2 | 6/2021 | Marolia et al. | |
| 11,070,304 B1 | 7/2021 | Levi et al. | |
| 11,206,625 B2 | 12/2021 | Kwon et al. | |
| 11,461,263 B2 | 10/2022 | Malladi et al. | |
| 11,853,215 B2 | 12/2023 | Jeong et al. | |
| 2003/0137997 A1 * | 7/2003 | Keating | H04J 3/0667 370/519 |
| 2003/0208631 A1 | 11/2003 | Matters et al. | |
| 2004/0085108 A1 * | 5/2004 | Murata | H03L 7/0816 327/158 |
| 2006/0090163 A1 * | 4/2006 | Karisson | G06F 11/3409 718/105 |
| 2009/0217280 A1 * | 8/2009 | Miller | G06F 9/52 718/104 |
| 2012/0069836 A1 * | 3/2012 | Tirkkonen | H04J 3/0638 370/350 |
| 2014/0250260 A1 * | 9/2014 | Yap | G11C 7/222 711/103 |
| 2014/0348181 A1 * | 11/2014 | Chandra | H04J 3/0667 370/503 |
| 2018/0189188 A1 | 7/2018 | Kumar et al. | |
| 2020/0125503 A1 | 4/2020 | Graniello et al. | |
| 2020/0371692 A1 | 11/2020 | Van Doorn et al. | |
| 2021/0109879 A1 * | 4/2021 | Das Sharma | G06F 15/167 |
| 2021/0117360 A1 | 4/2021 | Kutch et al. | |
| 2021/0149680 A1 | 5/2021 | Hughes et al. | |
| 2021/0150663 A1 | 5/2021 | Maiyuran et al. | |
| 2021/0150770 A1 | 5/2021 | Appu | |
| 2021/0263779 A1 | 8/2021 | Haghighat et al. | |
| 2021/0266253 A1 | 8/2021 | He et al. | |
| 2021/0274419 A1 | 9/2021 | Lin et al. | |
| 2021/0311646 A1 | 10/2021 | Malladi et al. | |
| 2021/0318961 A1 | 10/2021 | Peterson et al. | |
| 2021/0373951 A1 | 12/2021 | Malladi et al. | |
| 2022/0004330 A1 | 1/2022 | Guim Bernat et al. | |
| 2022/0066827 A1 | 3/2022 | Tavallaei et al. | |
| 2022/0066928 A1 | 3/2022 | Tavallaei et al. | |
| 2022/0066935 A1 | 3/2022 | Tavallaei et al. | |
| 2022/0075520 A1 | 3/2022 | Tavallaei et al. | |
| 2023/0086149 A1 | 3/2023 | Kuo et al. | |
| 2023/0092541 A1 | 3/2023 | Dugast et al. | |
| 2024/0045823 A1 | 2/2024 | Malladi et al. | |
| 2024/0085943 A1 * | 3/2024 | Van Oven | G06F 1/10 |
| 2024/0111680 A1 | 4/2024 | Branover | |
| 2024/0116541 A1 | 4/2024 | Hong | |
| 2024/0146805 A1 * | 5/2024 | Choi | G06F 13/1668 |

FOREIGN PATENT DOCUMENTS

| | | | |
|---|---|---|---|
| JP | 2010-009628 | * | 1/2010 |
| JP | 2010-009628 A | | 1/2010 |
| WO | WO 2015/089054 A1 | | 6/2015 |
| WO | WO 2022/083537 A1 | | 4/2022 |
| WO | WO 2022/221466 A1 | | 10/2022 |

OTHER PUBLICATIONS

Bit and Frame Synchronization Techniques; Probst et al.; Jan. 27, 2018; retrieved from https://web.archive.org/web/20180127171033/https://www4.comp.polyu.edu.hk/~comp2322/Bit%20and%20Frame%20Synchronization%20Techiques.pdf (Year: 2018).*
K. S. Yildirim, R. Carli and L. Schenato, "Adaptive Proportional-Integral Clock Synchronization in Wireless Sensor Networks," in IEEE Transactions on Control Systems Technology, vol. 26, No. 2, pp. 610-623, Mar. 2018, doi: 10.1109/TCST.2017.2692720. (Year: 2018).*
EPO Extended European Search Report dated Jan. 23, 2024, issued in corresponding European Patent Application No. 23189201.9 (7 pages).
Shrivastav, Vishal, et al., "Globally Synchronized Time via Datacenter Networks," IEEE/ACM Transactions of Networking, vol. 27, No. 4, Aug. 2019, pp. 1401-1416.
Putnam, Andrew, et al., "A Reconfigurable Fabric for Accelerating Large-Scale Datacenter Services," IEEE, Jul. 2014, 12 pages.
Wikipedia, Torus Interconnect, Jun. 23, 2022, 5 pages (Year: 2022).
Lee, S-s. et al., "MIND: In-Network Memory Management for Disaggregated Data Centers", SOSP '21, Oct. 26-29, 2021, Virtual Event, Germany, pp. 488-504, Association for Computing Machinery.
Li, CXL-Based Memory Pooling Systems for Cloud Platforms, Oct. 21, 2022, 17 pages (Year: 2022).
Li, H. et al., "First-generation Memory Disaggregation for Cloud Platforms", arXiv:2203.00241v2, Mar. 5, 2022, pp. 1-4.
Montaner, et al. "Getting Rid of Coherency Overhead for Memory-Hungry Applications," 2010 IEEE International Conference on Cluster Computing, 2010, pp. 48-57.
Ogleari, et al. "String Figure: a Scalable and Elastic Memory Network Architecture," 2019 IEEE International Symposium on High Performance Computer Architecture (HPCA), 2019, pp. 647-660.
Shan, Y. et al., "Towards a Fully Disaggregated and Programmable Data Center", APSys '22, Aug. 23-24, 2022, Virtual Event, Singapore, 11 pages.
Shantharama, et al. "Hardware-Accelerated Platforms and Infrastructures for Network Functions: a Survey of Enabling Technologies and Research Studies," IEEE, vol. 8, 2020, pp. 132021-132085.
Vaquero, et al. "Disaggregated Memory at the Edge," EdgeSys '21, Apr. 26, 2021, 6 pages.
Zahka, et al. "FAM-Graph: Graph Analytics on Disaggregated Memory," 2022 IEEE International Parallel and Distributed Processing Symposium (IPDPS), 2022, pp. 81-92.
European Search Report for EP 23202709.4 dated Feb. 28, 2024, 9 pages.

(56) References Cited

OTHER PUBLICATIONS

U.S. Office Action dated Jun. 18, 2024, issued in U.S. Appl. No. 18/152,076 (17 pages).
US Final Office Action dated Feb. 11, 2025, issued in U.S. Appl. No. 18/152,076 (15 pages).
US Notice of Allowance dated Apr. 30, 2025, issued in U.S. Appl. No. 18/152,076 (10 pages).

* cited by examiner

SYSTEMS AND METHODS FOR SYNCHRONOUS CELL SWITCHING FOR SCALABLE MEMORY

CROSS-REFERENCE TO RELATED APPLICATION(S)

This application claims priority to and the benefit of U.S. Provisional Application No. 63/465,794, filed on May 11, 2023, entitled "SYNCHRONOUS CELL/FLIT SWITCHING FABRIC FOR SCALABLE MEMORY POOING ARCHITECTURE," the entire content of which is incorporated by reference herein.

FIELD

One or more embodiments of the present disclosure relate to expandable memory, and more particularly, to coherent expandable memory.

BACKGROUND

Typically, unlike storage operations in which data is persistently stored in slower, non-volatile memory of storage devices, a computer may perform various operations by accessing data stored in high-speed computer memory. As such, the speed and performance of a computing system may depend on the amount of computer memory resources available to it, and the latencies associated with communications between processing elements and the computer memory resources.

The above information disclosed in this Background section is for enhancement of understanding of the background of the present disclosure, and therefore, it may contain information that does not constitute prior art.

SUMMARY

Computer memory resources may be aggregated together such that the total memory may be considered a memory "pool." A memory pool may act as a whole, rather than as individual memory components. Thus, a processor may also interact with the memory pool as a unified memory resource rather than as individual memory components. However, disparate memory resources that are aggregated into a memory pool may introduce large latencies.

One or more embodiments of the present disclosure are directed to systems and methods for reducing latencies of expandable memory connected to a host processor via a cache coherent protocol-based interconnect, for example, such as a compute express link (CXL) interconnect.

According to one or more embodiments of the present disclosure, a system includes: a group of memory resources including a first memory node and a second memory node, the first memory node being connected to the second memory node over a switching fabric; and a synchronous clock source connected to the first memory node and the second memory node, the synchronous clock source being configured to provide a synchronized clock signal to the first memory node and the second memory node to synchronize the first memory node with the second memory node. The first memory node and the second memory node are configured to encode memory data and decode encoded memory data using the synchronized clock signal.

In an embodiment, the first memory node may include a first controller, the first controller being configured to encode the memory data using the synchronized clock signal, and transmit the encoded memory data to the second memory node; and the second memory node may include a second controller, the second controller being configured to receive the encoded memory data from the first memory node, and decode the encoded memory data using the synchronized clock signal.

In an embodiment, the system may further include a memory group controller connected to: the first memory node and the second memory node via the switching fabric, the switching fabric including a cache coherent protocol-based interconnect; and an input/output (I/O) connection. The memory group controller may be configured to allocate memory from at least one of the first memory node or the second memory node by enabling communications between the I/O connection and the at least one of the first memory node or the second memory node.

In an embodiment, the system may further include: a first processor connected to the first memory node and the second memory node of the group of memory resources via the switching fabric, and connected to a first network interface card (NIC); and a second processor connected to a third memory node and a fourth memory node of the group of memory resources via a second switching fabric, and connected to a second NIC. The first processor may be configured to communicate with the second processor through the first NIC or the second NIC.

In an embodiment, the first NIC may be connected to the second NIC via a serial interface.

In an embodiment, the third memory node and the fourth memory node may be configured to encode memory data and decode encoded memory data using the synchronized clock signal.

In an embodiment, the first processor may include one of a system on chip (SoC), a central processing unit (CPU), a graphics processing unit (GPU), a tensor processing unit (TPU), a field-programmable gate array (FPGA), or an application-specific integrated circuit (ASIC).

In an embodiment, the first memory node may include a first one of a memory die, a memory module, a memory sled, a memory pod, or a memory rack, and the second memory node may include a second one of a memory die, a memory module, a memory sled, a memory pod, or a memory rack.

In an embodiment, the first memory node may include a first memory rack and the second memory node may include a second memory rack, the second memory rack being different from the first memory rack.

In an embodiment, a maximum latency between the first memory node and the second memory node may be less than a predetermined threshold.

In an embodiment, the system may further include a processor in communication with a processor memory, the processor memory storing instructions that, when executed by the processor, cause the processor to run an application that stores information in the group of memory resources.

In an embodiment, the first memory node may be further connected to the second memory node over a second switching fabric.

In an embodiment, the group of memory resources may be cache coherent.

According to one or more embodiments of the present disclosure, a system includes: a group of memory resources including: a first memory node including a first memory controller, a first memory, and a first cache coherent protocol-based interconnect; and a second memory node including a second memory controller, a second memory, and a second cache coherent protocol-based interconnect, the second memory node being connected to the first memory node over a switching fabric connecting the first cache coherent protocol-based interconnect with the second cache coherent protocol-based interconnect; and a synchronous clock source connected to the first memory node and the second memory node, the synchronous clock source being configured to provide a synchronized clock signal to the first memory node at the first cache coherent protocol-based interconnect and to the second memory node at the second cache coherent protocol-based interconnect to synchronize the first memory node with the second memory node. The first memory node and the second memory node are configured to send and receive memory data to and from each other using the same synchronized clock signal.

In an embodiment, the first memory node and the second memory node may be cache coherent.

In an embodiment, the first memory node and the second memory node may be configured to encode and decode the memory data that is sent and received from each other using the synchronized clock signal.

In an embodiment, the synchronous clock source may include: a clock synthesizer including a phase-locked loop; and a clock buffer.

In an embodiment, the clock buffer may be connected to the first memory node at the first cache coherent protocol-based interconnect, and may be connected to the second memory node at the second cache coherent protocol-based interconnect.

According to one or more embodiments of the present disclosure, a method of encoding and decoding data in separate memory nodes of a group of memory resources, includes: storing memory data in a first memory node; encoding the memory data using a synchronized clock signal at the first memory node; sending the encoded memory data to a second memory node via a switching fabric; receiving the encoded memory data at the second memory node via the switching fabric; and decoding the encoded memory data using the synchronized clock signal at the second memory node.

In an embodiment, the switching fabric may include a cache coherent protocol-based interconnect; the first memory node may include a first memory rack including a first plurality of memory devices; and the second memory node may include a second memory rack including a second plurality of memory devices.

BRIEF DESCRIPTION OF THE DRAWINGS

The above and other aspects and features of the present disclosure will be more clearly understood from the following detailed description of the illustrative, non-limiting embodiments with reference to the accompanying drawings.

DETAILED DESCRIPTION

Figure 1:
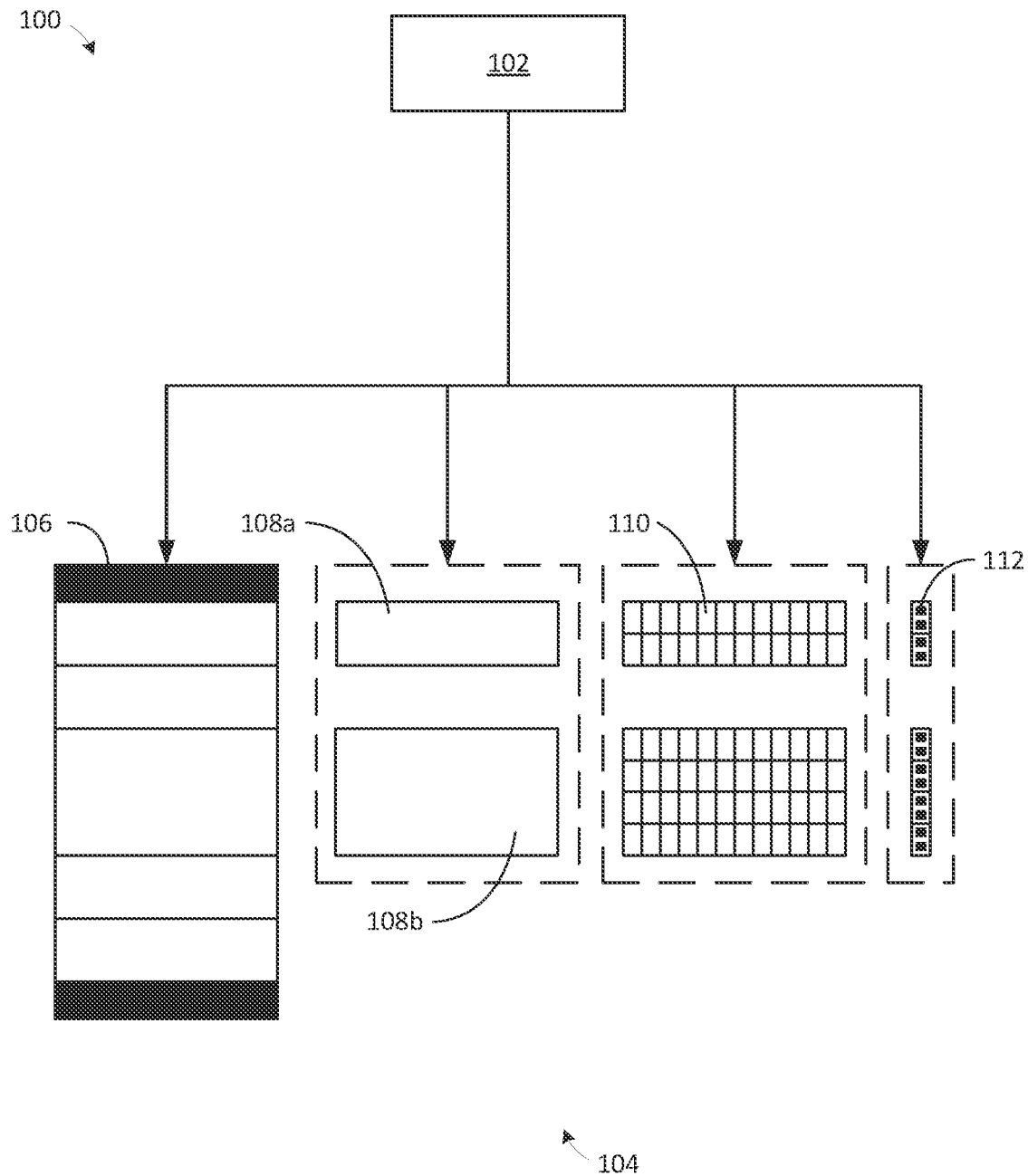
FIG. 1 is a schematic block diagram of an expandable memory system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Compute Express Link (CXL) is a cache-coherent interconnect designed to provide a low-latency, high-bandwidth connection between a host processor and other devices. CXL maintains a unified, coherent memory between the host processor and any memory on the connected CXL device. The host processor is primarily responsible for coherency management.

Networked computation and storage may face problems with increasing data demands. For example, hyperscale workloads may have increasing memory requirements, which may be difficult to satisfy while maintaining low latency. Further, the industry as a whole may be facing a shortage of feasible distributed shared memory and large address space systems. While some solutions exist to reduce latency in distributed memory systems, such as using CXL, a further reduction in latency may be desired to increase overall computation speeds and/or throughput.

In addition to relatively high latencies, existing distributed memory systems may face issues of unpredictable latency. For example, workloads may have varying latencies when communicating with distributed memory resources because the distributed memory resources use clock data recovery (CDR) when communicating with one another. Clock data recovery (CDR) is used when decoding memory data. For example, memory data may be encoded using a clock signal (e.g., to parallelize the memory data) before it is sent (e.g., between memory nodes). However, it may be impractical or undesirable to send the clock signal alongside the memory data. Thus, to decode the encoded memory data, a decoder may first perform clock data recovery (CDR) on the encoded data to obtain the original clock signal used to encode the data.

Clock data recovery (CDR) may be implemented by a controller or other device that may detect data transitions (e.g., between logical low to logical high) in the signal carrying the encoded memory data, lock on to the data transition frequency, and use the resulting frequency to generate a recovered clock signal that is the same as the original clock signal. Once the recovered clock signal is generated, the decoder may decode the encoded data using the recovered clock signal. CDR techniques may be implemented using digital signal processing algorithms or dedicated circuits. The extra processing/overhead needed to recover the original clock signal introduces latency in the operation of transmitting memory data. When used in memory pools, which may include many memory nodes, the extra processing/overhead at each memory node may significantly increase latency.

Moreover, latency may be unpredictable depending on the memory being accessed. For example, more CDR may be needed when storing/accessing memory data in one portion of a memory pool when compared with another portion of the memory pool. Having an uncertain amount of latency is disadvantageous because, for example, agreements between a processing server owner and memory server owner regarding a maximum latency may need to take into account variable latency rather than, for instance, a known/approximately unchanging latency. The extra processing/overhead may also increase energy consumption, especially in data centers that include large memory pools implemented over many servers. Accordingly, reducing an amount of latency and ensuring the latency is predictable are desirable aspects of a memory pool.

Peripheral Component Interconnect Express (PCIe) may refer to a computer interface that may have a relatively higher and variable latency, which may limit its usefulness in making connections to memory. CXL is an open industry standard for communications over PCIe 5.0, which may provide fixed, relatively shorter packet sizes, and as a result, may be able to provide relatively higher bandwidth and relatively lower, fixed latency. As such, CXL may be capable of supporting cache coherence, and CXL may be well suited for making connections to memory. CXL may further be used to provide connectivity between a host and accelerators, memory devices, and network interface circuits (or "network interface controllers" or network interface cards" (NICs)) in a server.

The CXL transaction layer may include three multiplexed sub-protocols that run concurrently or substantially simultaneously on a single link, and may be referred to as CXL.io, CXL.cache, and CXL.memory. CXL.io may include I/O semantics, which may be similar to PCIe. CXL.cache may include caching semantics, and CXL.memory may include memory semantics. Further, Gen-Z protocol worked on for memory semantics and OpenCAPI protocol worked on for caching semantics may be folded into CXL as a part of CXL protocols.

In some embodiments, the use of CXL connections to an aggregation, or "pool," of memory (e.g., a quantity of memory, including a plurality of memory cells connected together) may provide various advantages, for example, such as in a system that includes a plurality of servers connected together by a network. For example, a CXL switch having further capabilities in addition to providing packet-switching functionality for CXL packets (referred to herein as an "enhanced capability CXL switch") may be used to connect the aggregation of memory to one or more central processing units (CPUs) (or "central processing circuits") and to one or more network interface circuits (which may have enhanced capability).

In some embodiments, a memory pool includes individual memory nodes connected together with each memory node including individual memory cells. The memory nodes may be aggregated into a memory pool using CXL connections. However, while using CXL connections may reduce latency between a central processor and a memory pool, the latency between memory nodes of the memory pool may not be similarly reduced.

According to one or more embodiments of the present disclosure, a system may include a memory pool including a first memory node and a second memory node, and a synchronous clock source connected to both the first memory node and the second memory node to reduce latency of communications between the first memory node and the second memory node. For example, the first memory node and the second memory node may be configured to encode memory data and decode encoded memory data using a synchronized clock signal generated by the synchronous clock source.

While one or more embodiments of the present disclosure are described in more detail in the context of CXL memory and CXL interfaces and interconnects, the present disclosure is not limited thereto, and the memory may be any suitable kind of expandable memory that is connected via any suitable kind of interface or interconnects, for example, such as NVLink/Nvidia based memory pooling. The above and/or other aspects and features of the present disclosure will be described in more detail hereinafter with reference to the figures.

FIG. 1 is a schematic block diagram of an expandable memory system 100 according to one or more embodiments of the present disclosure. In brief overview, the expandable memory system 100 may include a synchronous clock source 102 connected to various suitable forms of memory that may make up a memory pool 104. A memory pool 104 may include a group of memory resources.

The various forms of memory may include high speed, volatile, computer memory, which is generally referred to as "memory." For example, each of the various forms of memory may include Dynamic Random Access Memory (DRAM) or Static Random Access Memory (SRAM) technologies. In comparison, slower, non-volatile computer storage is generally referred to as "storage." For example, storage may use storage technologies including, but not limited to, read-only memory (ROM), erasable programmable read-only memory (EPROM), hard disk drives (HDDs), and flash memory. As will be described in more detail hereinafter, the synchronous clock source 102 may generate a synchronized clock signal to enable lower latency communications between the memory nodes (e.g., memory to memory communications) of the memory pool 104. As will be appreciated by a person having ordinary skill in the art, the memory nodes of a memory pool may include any suitable forms of memory.

For example, one form of memory may include a "rack" of memory such as a memory rack 106. The memory rack 106 may hold large amounts of memory, and may also include components other than the memory. For example, the memory rack 106 may include networking devices, power supply devices, persistent storage devices (e.g., hard disk drives, solid state drives, and/or the like), processing devices, cooling devices, switching devices, suitable combinations thereof, and/or the like. The memory rack 106 may have different sizes and shapes to hold different amounts of memory. The memory rack 106 may be useful in applications where large amounts of data is necessary or desired, for example, in a data center with distributed computing resources. In FIG. 1, the memory rack 106 includes one or more memory pods 108a, 108b, which are another form of memory.

A memory pod (e.g., 108a, 108b), in similarity with a memory rack, may hold large amounts of memory, and may include components other than the memory, such as one or more of those listed above with respect to the memory rack. However, a memory pod (e.g., 108a, 108b) generally holds less memory than a memory rack (e.g., 106). A memory pod may take different sizes and shapes, for example, such that the memory pod 108a is smaller and may hold less memory compared to the memory pod 108b. In FIG. 1, the memory pods 108a, 108b include one or more memory sleds 110, which are another form of memory.

A memory sled (e.g., 110) may hold a medium amount of memory, and may include components other than the memory. For example, a memory sled may include a central processing unit (CPU) and networking components, in addition to memory components. In FIG. 1, each of the memory sleds 110 may include one or more memory modules 112, which are another form of memory. A memory sled may include a printed circuit board on which the one or more memory modules 112 and other components (e.g., CPU) are mounted.

A memory module (e.g., a memory chip) may hold a relatively smaller amount of memory compared to the other forms of memory described above. In general, a memory module may have various form factors, and may be a package (e.g., a package including a printed circuit board and components connected to it, or an enclosure including a printed circuit board) including one or more memory dies, each memory die including a plurality of memory cells. Each memory die, or each of a set of groups of memory dies, may be in a package (e.g., an epoxy mold compound (EMC) package) soldered to the printed circuit board of the memory module (or connected to the printed circuit board of the memory module through a connector). Each of the memory modules may have a CXL interface, and may include a controller (e.g., an FPGA, an ASIC, a processor, and/or the like) for translating between CXL packets and the memory interface of the memory dies, e.g., the signals suitable for the memory technology of the memory in the memory module. As used herein, the "memory interface" of the memory dies is the interface that is native to the technology of the memory dies, e.g., in the case of DRAM, the memory interface may be word lines and bit lines.

As described above with reference to FIG. 1, a memory node may include more than one memory rack, an individual memory rack, a memory pod, a memory sled, a memory module, a memory die, or a memory cell. Additionally, the synchronous clock source 102 may be connected to the memory node, whether it includes multiple memory racks, an individual memory rack, a memory pod, a memory sled, a memory module, a memory die, or a memory cell. In some embodiments, the synchronous clock source 102 is connected to multiple memory nodes. In some embodiments, the synchronous clock source 102 is connected to multiple different forms of memory (e.g., a rack and a module).

Figure 2:
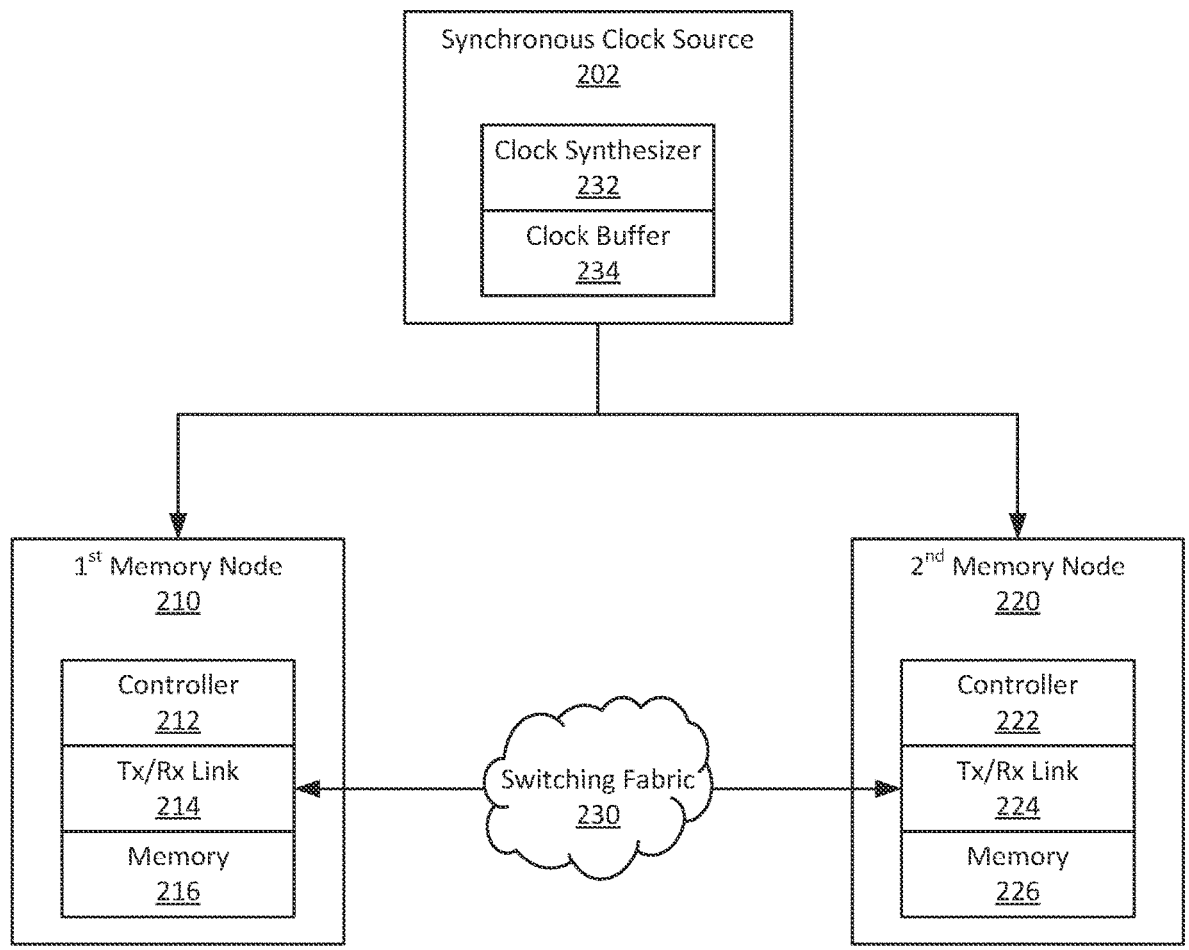
FIG. 2 is a schematic block diagram of a synchronous clock source connected to a first memory node and a second memory node according to one or more embodiments of the present disclosure.

FIG. 2 is a schematic block diagram of a synchronous clock source 202 connected to a first memory node 210 and a second memory node 220 according to one or more embodiments of the present disclosure. The synchronous clock source 202 may include a clock synthesizer 232 and a clock buffer 234. In operation, the synchronous clock source 202 generates one or more synchronized clock signals, which may be distributed to various devices including the first memory node 210 and the second memory node 220.

In the illustrated embodiment, the clock synthesizer 232 of the synchronous clock source 202 may generate one or more synchronized clock signals with suitable (e.g., predetermined or specific) frequencies and phase relationships. However, as would be appreciated by those having ordinary skill in the art, a synchronized clock signal generated by the clock synthesizer 232 is not limited to any one frequency, range of frequencies, period, phase, duration, polarity, duty cycle, amplitude, and the like. The clock synthesizer 232 may include a reference clock signal, which it may use to generate the one or more synchronized clock signals. In some embodiments, the reference clock signal may be generated internally to the clock synthesizer 232. For example, the reference clock signal may be generated by a crystal oscillator or an atomic clock. Additionally or alternatively, in some embodiments, a reference clock signal may be received by the clock synthesizer 232 from an external source.

In some example operations, the clock synthesizer 232 may use a reference clock with a phase-locked loop control system to generate a desired output clock signal having a desired frequency and/or phase. The phase-locked loop control system may include any suitable kinds of phase-locked loop control including analog or linear phase-locked loops, digital phase-locked loops, all digital phase-locked loops, software phase-locked loops, charge-pump phase-locked loops, and/or the like. In some embodiments, a delay-locked loop control system is used to generate a desired output clock. By using a phase-locked loop control system or a delay-locked loop control system, the clock synthesizer 232 may generate a more precise clock that keeps in phase with that of a reference clock.

In some embodiments, the clock synthesizer 232 does not use a phase-locked loop or delay-locked loop control system. Instead, the clock synthesizer 232 may use other suitable means for generating a more precise clock and maintaining an accuracy for the clock. For example, in some embodiments, the clock synthesizer may use a crystal oscillator, an atomic clock, or the like. The clock synthesizer 232 may also include a clock multiplier to generate a clock signal having a higher frequency than that of a reference clock signal or other, generated clock signal.

In the embodiment illustrated in FIG. 2, the synchronous clock source 202 also includes a clock buffer 234. The clock buffer 234 may be configured to amplify and/or distribute a clock signal generated by the clock synthesizer 232 to other components. In FIG. 2, the clock buffer 234 may enable a synchronized clock signal generated by the clock synthesizer 232 to reach both the first memory node 210 and the second memory node 220. Further, in some embodiments, a synchronized clock signal generated by the clock synthesizer 232 may be amplified before being distributed to other devices, such as the first memory node and the second memory node. In some embodiments, additional clock buffer circuits may be used, separate from the synchronous clock source 202, to amplify and/or distribute a synchronized clock signal. The additional clock buffer circuits may help ensure a synchronized clock signal does not degrade over longer distances (e.g., between racks in a data center).

Still referring to FIG. 2, the first memory node 210 and the second memory node 220 are connected to, or are otherwise in communication with, the synchronous clock source 202. In an example operation, the first memory node 210 and the second memory node 220 receive a synchronized clock signal from the synchronous clock source 202. The synchronized clock signal may be used by the first memory node 210 and the second memory node 220 to facilitate memory communications between them.

As described above with reference to FIG. 1, a memory node, such as the first memory node 210 and the second memory node 220, may include any suitable form of memory including, but not limited to, a memory rack, a memory pod, a memory sled, a memory module, a memory die, or a memory cell. In the embodiment of FIG. 2, the first memory node 210 includes a first controller 212, a first link 214 for transmitting and receiving memory data, and a first memory 216. Similarly, the second memory node 220 includes a second controller 222, a second link 224 for transmitting and receiving memory data, and a second memory 226. The first memory 216 and the second memory 226 may include physical memory, such as the circuits that include DRAM and/or SRAM. However, the first controller 212, the second controller 222, the first link 214, and the second link 224 may include more complex circuitry. For example, in some embodiments, the first controller 212 and the second controller 222 include memory controllers, which may perform memory operations including, but not limited to, address translation, data transfer, memory timing and control, caching, error detecting and correction, memory configuration and management, and/or the like. In some embodiments, the first link 214 is integrated with the first controller 212 while the second link 224 is integrated with the second controller 222.

The first memory node 210 and the second memory node 220 may communicate with each other through a switching fabric 230. In general, the switching fabric 230 operates to connect one or more devices, such as memory nodes, with one or more other devices, such as other memory nodes, while reducing the latency between them. In some embodiments, the switching fabric 230 may include one or more CXL switches and associated devices. Accordingly, in such embodiments, the switching fabric 230 may be defined as including a compute express link (CXL) interconnect. A CXL switch may (i) support memory and accelerator disaggregation through single level switching, (ii) enable resources to be off-lined and on-lined between domains, which may enable time-multiplexing across domains, based on demand, and (iii) support virtualization of downstream ports. CXL may be employed to implement aggregated memory, which may enable one-to-many and many-to-one switching. Various suitable switching topologies may be used to scale up/down the memory pool size, such as typical tree and mesh topologies. In some embodiments, CXL memory pooling with hyper-torus topology basis may be used to reduce the latency and provide latency manageable capability for the memory nodes. CXL switches are further discussed in U.S. Pat. No. 11,461,263 which is hereby incorporated by reference in its entirety.

The switching fabric 230 may also include a fabric manager. The fabric manager may be employed to (i) perform device discovery and virtual CXL software creation, and to (ii) bind virtual ports to physical ports. The fabric manager may be implemented in hardware, software, firmware, or a suitable combination thereof, and may reside, for example, in one of the memory nodes, or in a switch, or elsewhere in the network. The fabric manager may issue commands to various components of the switching fabric 230 to perform the above-described operations.

In FIG. 2, the switching fabric 230 is configured to connect the first memory node 210 to the second memory node 220. By connecting the first memory node 210 with the second memory node 220, the first memory 216 of the first memory node 210 may be aggregated with the second memory 226 of the second memory node 220. For example, when connected via the switching fabric 230, the first memory 216 may transmit memory data to the second memory 226. Similarly, the second memory 226 may transmit memory data to the first memory 216. Transmitting memory data between the first memory node 210 and the second memory node 220 may also enable the first memory 216 and the second memory 226 to maintain cache coherency.

To transmit memory data from the first memory node 210 to the second memory node 220, the first memory node 210 may include an encoder while the second memory node 220 may include a decoder. An encoder may encode memory data to serialize the memory data before it is sent, while a decoder may decode received, encoded memory data to unserialize/parallelize the memory data. Similarly, to transmit memory data from the second memory node 220 to the first memory node 210, the second memory node 220 may also include an encoder, and the first memory node 210 may also include a decoder. In the example of FIG. 2, both the first controller 212 and the second controller 222 may include, or may be configured to implement, an encoder and a decoder. Additionally or alternatively, in some embodiments, the first link 214 and the second link 224 may include, or may be configured to implement, an encoder and a decoder.

According to one or more embodiments of the present disclosure, as shown in FIG. 2, no CDR is used, which may save energy and reduce latency. To avoid CDR, the first memory node 210 and the second memory node 220 may use the synchronized clock signal to both encode and decode memory data. As illustrated in FIG. 2, the synchronous clock source 202 generates the synchronized clock signal that is transmitted to both the first memory node 210 and the second memory node 220 for encoding and decoding memory data. In some embodiments, the first controller 212 and the second controller 222 both encode and decode memory data. Additionally or alternatively, in some embodiments, the first link 214 and the second link 224 both encode and decode memory data. The first memory node 210 may use the synchronized clock signal generated by the synchronous clock source 202 to encode memory data. Once encoded, the first memory node 210 may send the encoded data to the second memory node 220 via the switching fabric 230. The second memory node 220 may then receive the encoded memory data and decode the encoded memory data using the synchronized clock signal (e.g., the same synchronized clock signal) generated by the synchronous clock source 202. By having a synchronized clock connected to both the sending (e.g., encoding) and receiving (e.g., decoding) sides, clock data recovery may be avoided as the encoding and decoding share the same clock signal. Thus, the clock signal used to encode the memory data may be the same as the clock signal used to decode the memory data.

Figure 3B:
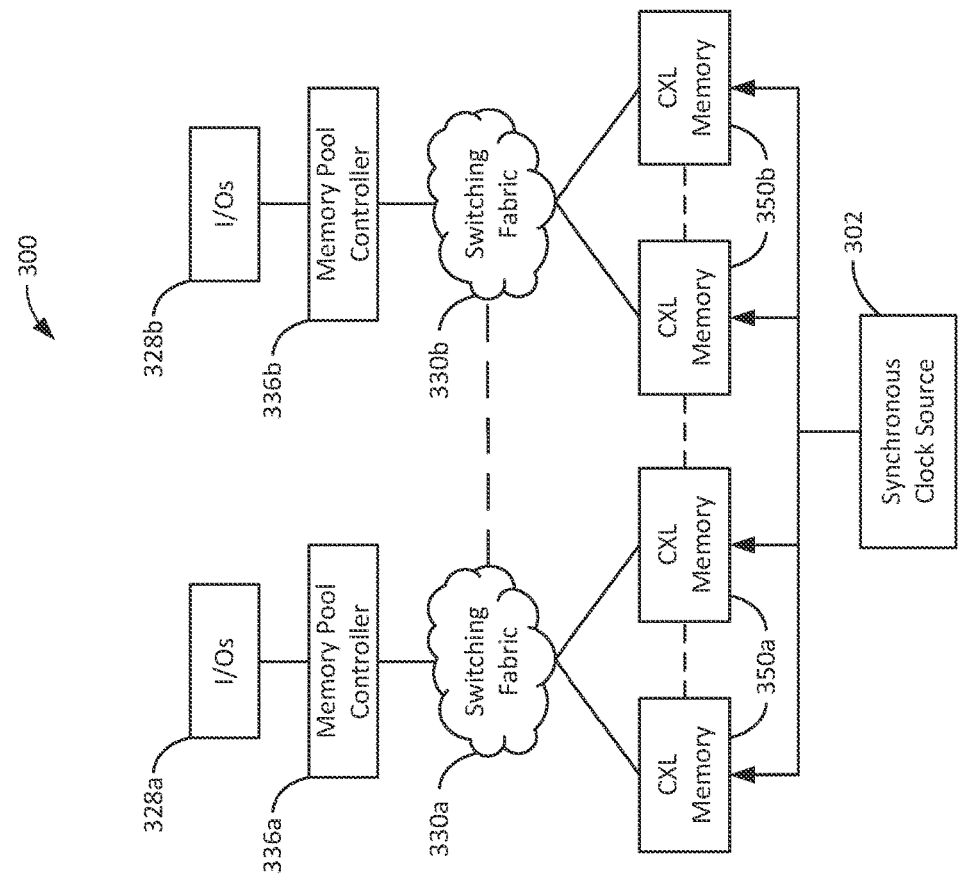
FIG. 3B is a schematic block diagram of a system including multiple memory pool controllers connected to memory according to one or more embodiments of the present disclosure.
Figure 3A:
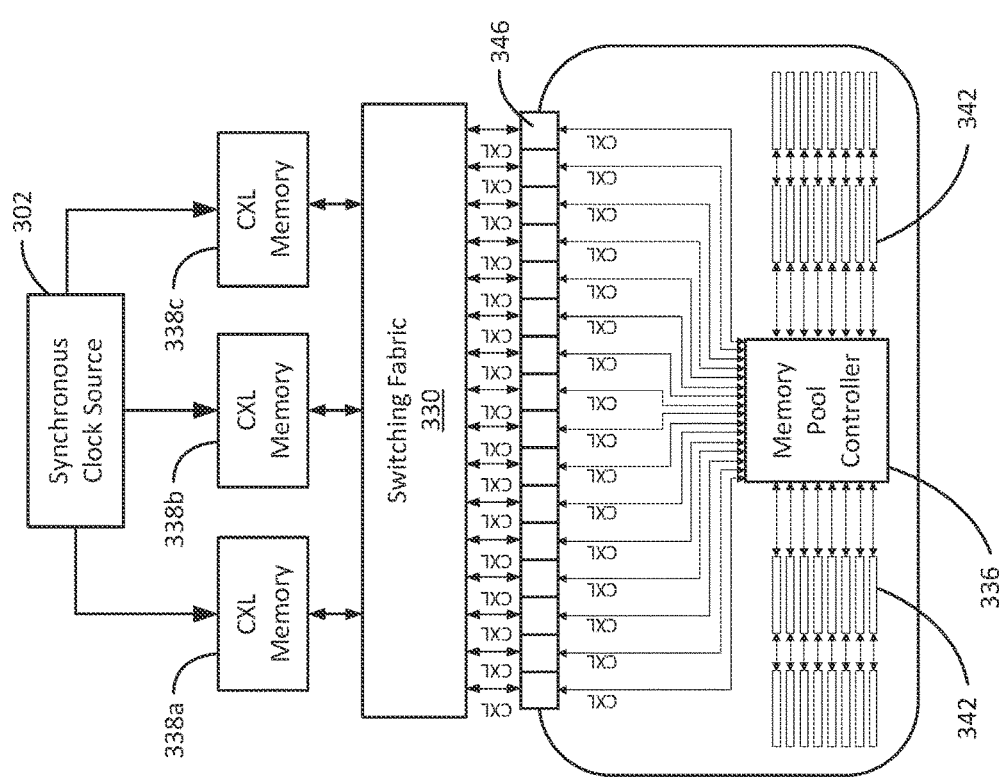
FIG. 3A is a schematic block diagram of a memory pool controller connected to memory over a switching fabric including a compute express link (CXL) interconnect according to one or more embodiments of the present disclosure.

FIG. 3A is a schematic block diagram of a memory pool controller 336 connected to CXL memory 338a, 338b, 338c over a switching fabric 330 including a compute express link (CXL) interconnect according to one or more embodiments of the present disclosure. The memory pool controller 336 (e.g., also referred to as a memory group controller) may include any suitable kind of processor or processing circuit including, but not limited to, a system on chip (SoC), a central processing unit (CPU), a graphics processing unit (GPU), a tensor processing unit (TPU), an application-specific integrated circuit (ASIC), a field-programmable gate array (FPGA), and/or the like. The memory pool controller 336 may optionally be connected to one or more dual in-line memory modules (DIMMs) 342, which may include traditional memory modules (e.g., without CXL). The DIMMs may be used by the memory pool controller 336 as a cache, to store instructions for the memory pool controller 336 to execute, and/or the like.

In operation, the memory pool controller 336 may control aspects of the CXL memory 338a including, but not limited to, address translation, data transfer, memory timing and control, caching, error detecting and correction, memory configuration and management, and/or the like. For example, the memory pool controller 336 may allocate the CXL memory connected to the memory pool controller 336 through the switching fabric 330. The switching fabric 330 includes a cache coherent protocol-based interconnect, for example, such as a CXL interconnect. In some embodiments, the CXL interconnect includes one or more CXL switches and one or more CXL ports 346 connected to the memory pool controller 336. The CXL memory 338a, 338b, 338c may include a memory node (e.g., the first memory node 210, the second memory node 220, and/or the like). Any suitable number of CXL memory 338a, 338b, 338c may be connected to the memory pool controller 336 through the switching fabric 330. For example, each CXL port 346 connected to the memory pool controller 336 may be connected to a separate CXL memory through the switching fabric 330. Additionally or alternatively, more than one CXL port 446 may be connected to each CXL memory through the switching fabric 330.

In FIG. 3A, the CXL memory 338a, 338b, 338c may together compose a memory pool. Further, the illustrated embodiment of FIG. 3A includes a synchronous clock source 302 that is connected to each of the CXL memory 338a, 338b, 338c. In operation, the synchronous clock source 302 generates a synchronized clock signal that is used by each of the CXL memory 338a, 338b, 338c to reduce communication latency between them when they are aggregated together as a memory pool. Thus, the memory pool controller 336 may use the CXL memory 338a, 338b, 338c as a memory pool with an overall reduced latency when compared to using the CXL memory 338a, 338b, 338c as a memory pool without a synchronous clock source 302.

In some embodiments, the memory pool controller 336 may be configured to allocate the CXL memory 338a, 338b, 338c. For example, a host processor connected to the memory pool controller 336 may request (e.g., may require) a specific amount of memory to run an application. In some such embodiments, the memory pool controller 336 may allocate a specific amount of CXL memory (e.g., 338a, 338b, 338c) by enabling certain CXL ports 346 associated with the specified amount of CXL memory.

In some embodiments, the memory pool controller 336 may also be used to ensure cache coherency within a memory pool including CXL memory (e.g., 338a, 338b, 338c). For example, when there is an inconsistency within the CXL memory (e.g., between memory nodes of a CXL memory pool), the memory pool controller may be used to resolve the inconsistency, or to request updated memory data from a connected host processor.

FIG. 3B is a schematic block diagram of a system 300 including multiple memory pool controllers 336a, 336b connected to memory according to one or more embodiments of the present disclosure. FIG. 3B includes a first memory pool controller 336a connected to a first CXL memory 350a through a first switching fabric 330a. The first memory pool controller 336a is also connected to one or more first input/output connections (I/Os) 328a. FIG. 3B also includes a second memory pool controller 336b connected to a second CXL memory 350b through a second switching fabric 330b. The second memory pool controller 336b is also connected to one or more second input/output connections (I/Os) 328b. In some embodiments, the memory pool controllers 336a, 336b communicate with a host processor through their respective I/Os 328a, 328b.

In some example operations, the first memory pool controller 336a may allocate and manage the first CXL memory 350a, such that a host processor (or processors) may use a desired amount of the first CXL memory 350a. In such example operations, the host processor (or processors) may communicate with the first memory pool controller 336a through the first I/Os 328a. For example, in some embodiments, a host processor (or processors) may request an amount of I/Os to use with the number of I/Os determining how much CXL memory the host processor has access to. Similarly, the second memory pool controller 336b may allocate and manage the second CXL memory 350b, such that a host processor (or processors) may access and use a desired amount of the second CXL memory 350b. In such example operations, the host processor (or processors) may communicate with the second memory pool controller 336b through the second I/Os 328b.

In some example operations, the first memory pool controller 336a and the second memory pool controller 336b may communicate with each other to allocate memory and/or perform other memory functions as discussed above with reference to FIG. 3A. The first memory pool controller 336a may communicate with the second memory pool controller 336b through the first switching fabric 330a and the second switching fabric 330b. In some embodiments, the first switching fabric 330a and the second switching fabric 330b may be part of a single switching fabric. In such embodiments, the first memory pool controller 336a may communicate with the second memory pool controller 336b through the single switching fabric.

In some embodiments, the first memory pool controller 336a may allocate/manage the first CXL memory 350a and/or the second CXL memory 350b. In some such embodiments, the first memory pool controller 336a may communicate with the second CXL memory 350b through the first and second switching fabrics 330a, 330b. Similarly, in some embodiments, the second memory pool controller 336b may allocate/manage the first CXL memory 350a and/or the second CXL memory 350b. In some such embodiments, the second memory pool controller 336b may communicate with the first CXL memory 350a through the first and second switching fabrics 330a, 330b.

The embodiment of FIG. 3B also includes the synchronous clock source 302, which is configured to generate a synchronized clock signal and send the synchronized clock signal to the first CXL memory 350a and the second CXL memory 350b. The first CXL memory 350a and the second CXL memory 350b may include individual memory nodes, and each of the individual memory nodes may receive the synchronized clock signal. The synchronized clock signal may be helpful in reducing communication latency between the memory nodes, such as between individual memory nodes that make up the first CXL memory 350a and/or between individual memory nodes that make up the second CXL memory 350b.

In some embodiments, the first CXL memory 350*a* and the second CXL memory 350*b* are aggregated into a single memory pool, which may be allocated/managed by the first memory pool controller 336*a* and/or by the second memory pool controller 336*b*. The synchronized clock signal generated by the synchronous clock source 302 may be used to reduce communication latency between the CXL memory (e.g., memory nodes) that make up the memory pool.

In some embodiments, the first CXL memory 350*a* may communicate with the second CXL memory 350*b* via the switching fabric(s) (e.g., 330*a*, 330*b*) to maintain cache coherency between the first CXL memory 350*a* and the second CXL memory 350*b*.

While the embodiment of FIG. 3B illustrates an example of two memory pool controllers connected to a switching fabric, CXL memory, and I/Os, the present disclosure is not limited thereto, and any suitable number of memory pool controllers, I/Os, switching fabrics, and CXL memory may be included as needed or desired.

Figures 4A, 4B:
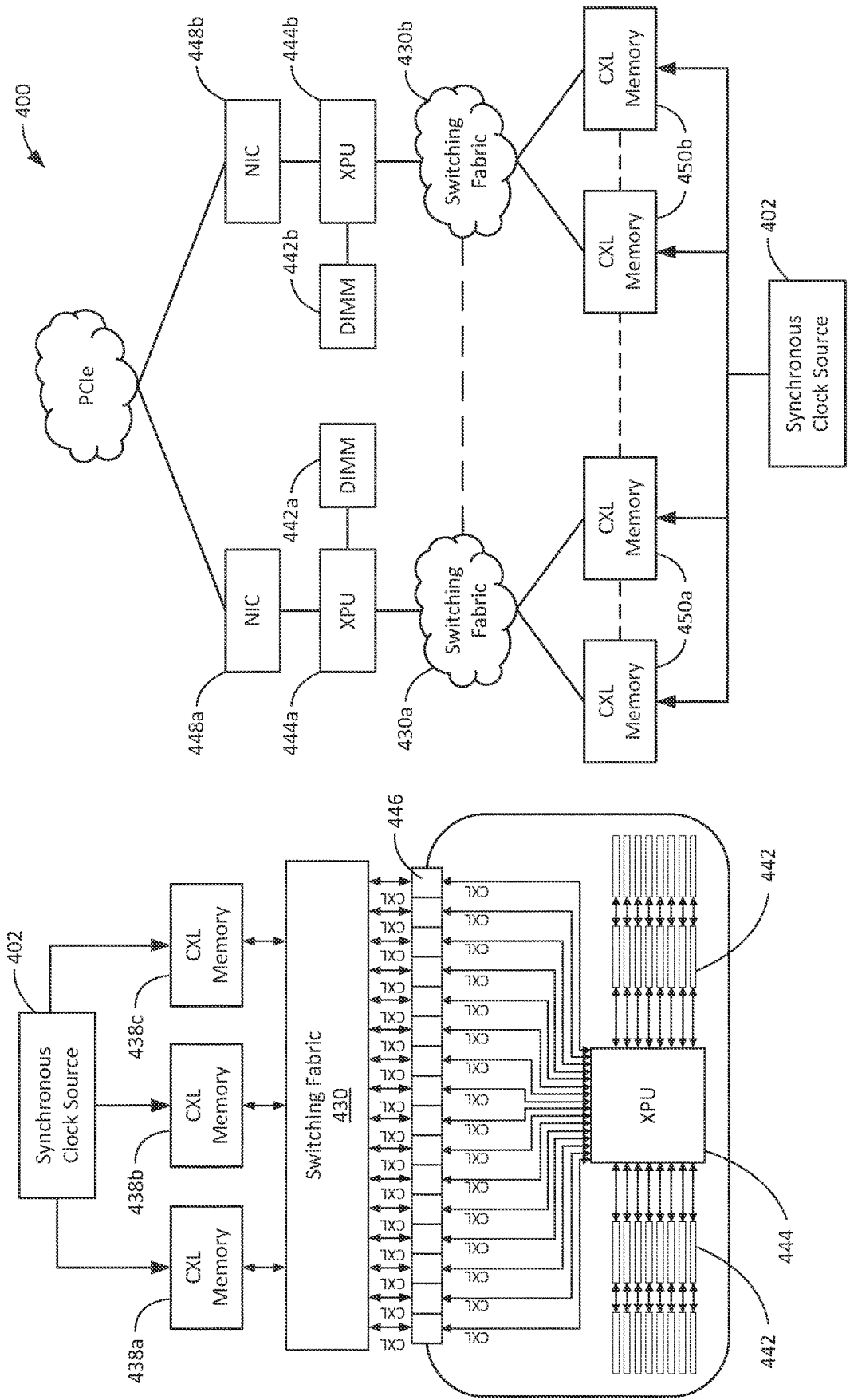
FIG. 4A is a schematic block diagram of a heterogeneous processor (XPU) connected to memory over a switching fabric including a compute express link (CXL) interconnect according to one or more embodiments of the present disclosure.
FIG. 4B is a schematic block diagram of a system including multiple heterogeneous processors (XPUs) connected to memory according to one or more embodiments of the present disclosure.

FIG. 4A is a schematic block diagram of a heterogeneous processor (XPU) 444 connected to CXL memory 438*a*, 438*b*, 438*c* over a switching fabric 430 including a compute express link (CXL) interconnect according to one or more embodiments of the present disclosure. The heterogeneous processor (XPU) 444 may include any suitable kind of processor or processing circuit including, but not limited to, a central processing unit (CPU), a graphics processing unit (GPU), an application-specific integrated circuit (ASIC), a field-programmable gate array (FPGA), a neural processing unit (NPU), an accelerated processing unit (APU), a vision processing unit (VPU), an SoC, and/or the like.

The XPU 444 may be connected to one or more dual in-line memory modules (DIMMs) 442, which may include traditional memory modules (e.g., without CXL). The DIMMs may be used as processor memory for the XPU, and may store instructions that, when executed by the XPU, cause the XPU to run an application. In some embodiments, the DIMMs may be used to store information generated by the application. However, in some embodiments, an application may desire (e.g., may require) additional memory that exceeds the capacity of the DIMMs. Accordingly, the XPU 444 is connected with CXL memory 438*a*, 438*b*, 438*c* through the switching fabric 430, which includes a cache coherent protocol-based interconnect, such as a CXL interconnect. While the CXL memory 438*a*, 438*b*, 438*c* may have a relatively higher latency than the DIMMs, which may be physically closer to the XPU, the CXL memory 438*a*, 438*b*, 438*c* may include a relatively greater capacity (e.g., a much greater capacity) of memory.

In some embodiments, the CXL interconnect includes one or more CXL switches and one or more CXL ports 446 connected to the XPU 444 (or memory controller as in FIG. 3A). The CXL memory 438*a*, 438*b*, 438*c* may include a memory node (e.g., the first memory node 210, the second memory node 220, and/or the like). Any suitable number of CXL memory 438*a*, 438*b*, 438*c* may be connected to the XPU 444 through the switching fabric 430. For example, each CXL port 446 connected to the XPU 444 may be connected to a separate CXL memory through the switching fabric 430. Additionally or alternatively, more than one CXL port 446 may be connected to each CXL memory through the switching fabric 430.

In FIG. 4A, the CXL memory 438*a*, 438*b*, 438*c* may together compose a memory pool. Further, the illustrated embodiment of FIG. 4A includes a synchronous clock source 402 that is connected to each CXL memory 438*a*, 438*b*, 438*c*. In operation, the synchronous clock source 402 generates a synchronized clock signal that is used by each of the CXL memory 438*a*, 438*b*, 438*c* to reduce communication latency between them when they are aggregated together as a memory pool. Thus, the XPU 444 may use the CXL memory 438*a*, 438*b*, 438*c* as a memory pool with an overall reduced latency when compared to using the CXL memory 438*a*, 438*b*, 438*c* as a memory pool without a synchronous clock source 402.

In some embodiments, the XPU 444 may include additional functionality. For example, the XPU 444 may be configured to allocate the CXL memory 438*a*, 438*b*, 438*c* based on its need for memory or based on another connected processor's need for memory. In some such embodiments, the XPU 444 may allocate the CXL memory 438*a*, 438*b*, 438*c* by enabling the CXL ports 446 associated with a desired amount of CXL memory. As such, the XPU 444 may dynamically allocate, or compose, an amount of CXL memory to be used by the XPU 444 and/or by another connected processor.

FIG. 4B is a schematic block diagram of a system 400 including multiple heterogeneous processors (XPUs) 444*a*, 444*b* connected to memory according to one or more embodiments of the present disclosure. In general, the embodiment of FIG. 4B illustrates a system including a plurality of the heterogeneous processor of FIG. 4A and the connections of the heterogeneous processor with CXL memory as in FIG. 4A. FIG. 4B includes a first XPU 444*a* connected to first CXL memory 450*a* through a first switching fabric 430*a*. The first XPU 444*a* is also connected to a first DIMM 442*a* and a first networking interface card (NIC) 448*a*. FIG. 4B also includes a second XPU 444*b* connected to a second CXL memory 450*b* through a second switching fabric 430*b*. The second XPU 444*b* is also connected to a second DIMM 442*b* and a second network interface card (NIC) 448*b*.

In operation, the first XPU 444*a* and the second XPU 444*b* may communicate with each other to run an application and may be used as aggregated computing resources. The first XPU 444*a* and the second XPU 444*b* may communicate with each other through their respective NICs 448*a*, 448*b*. In the embodiment of FIG. 4B, the first XPU 444*a* and the second XPU 444*b* may communicate with each other through their respective NICs 448*a*, 448*b* using a serial interface, such as peripheral component interconnect express (PCIe). However, in some embodiments, the first XPU 444*a* and the second XPU 444*b* may communicate with each other through their respective NICs 448*a*, 448*b* using another suitable interconnect (e.g., ethernet). In some embodiments, the first NIC 448*a* may be integrated with the first XPU 444*a*, and the second NIC 448*b* may be integrated with the second XPU 444*b*.

Further in FIG. 4B, the first switching fabric 430*a* may be connected with the second switching fabric 430*b*. Alternatively, in some embodiments, the first switching fabric 430*a* and the second switching fabric 430*b* may include a single switching fabric. Accordingly, the first CXL memory 450*a* may be used by both the first XPU 444*a* and the second XPU 444*b* due to the connection between the first switching fabric 430*a* and the second switching fabric 430*b*. For example, in some embodiments, if one or both of the first XPU 444*a* and the second XPU 444*b* are running an application that desires (e.g., requires) using CXL memory (e.g., due to large memory requirements), the first XPU 444*a* may store/access memory data in the first CXL memory 450*a* and/or in the second CXL memory 450*b*, and the second XPU 444*b* may also store/access memory data in the first CXL memory 450*a* and/or in the second CXL memory 450*b*. Further, in some embodiments, the first CXL memory 450*a* may communicate with the second CXL memory 450*b* via the switching fabric(s) (e.g., 430*a*, 430*b*) to maintain cache coherency between the first CXL memory 450*a* and the second CXL memory 450*b*.

The embodiment of FIG. 4B also includes the synchronous clock source 402, which is configured to generate a synchronized clock signal and send the synchronized clock signal to the first CXL memory 450*a* and the second CXL memory 450*b*. The first CXL memory 450*a* and the second CXL memory 450*b* may include individual memory nodes, with each individual memory node being able to receive the synchronized clock signal. The synchronized clock signal may be helpful in reducing communication latency between memory nodes, such as between individual memory nodes that make up the first CXL memory 450*a* and/or between individual memory nodes that make up the second CXL memory 450*b*.

In some embodiments, the first CXL memory 450*a* and the second CXL memory 450*b* are aggregated into a single memory pool, which may be accessed by the first XPU 444*a* and/or the second XPU 444*b*. The synchronized clock signal generated by the synchronous clock source 402 may be used to reduce communication latency between the CXL memory (e.g., memory nodes) that make up the memory pool.

While the illustrated embodiment of FIG. 4B includes an example of two XPUs that are connected to a NIC, DIMM, a switching fabric, and to CXL memory, the present disclosure is not limited thereto, and any suitable number of XPUs, NICs, DIMMs, switching fabrics, and CXL memory may be included.

In some embodiments, the dashed lines between the CXL memory nodes illustrated in the figures indicate direct communications between the CXL memory nodes using, for example, a cache coherent protocol-based interconnect such an inter switch link (ISL) based on a CXL interface. Using ISL may reduce latency to less than 1 micro-second (µs), such as, for example, to about 600 nano-seconds (ns) to 900 ns. However, the present disclosure is not limited thereto, and in some embodiments, remote direct memory access (RDMA) or other network-based protocol may be used for direct communications between the CXL memory nodes if the longer latency of such network-based protocols can be tolerated.

Figure 5:
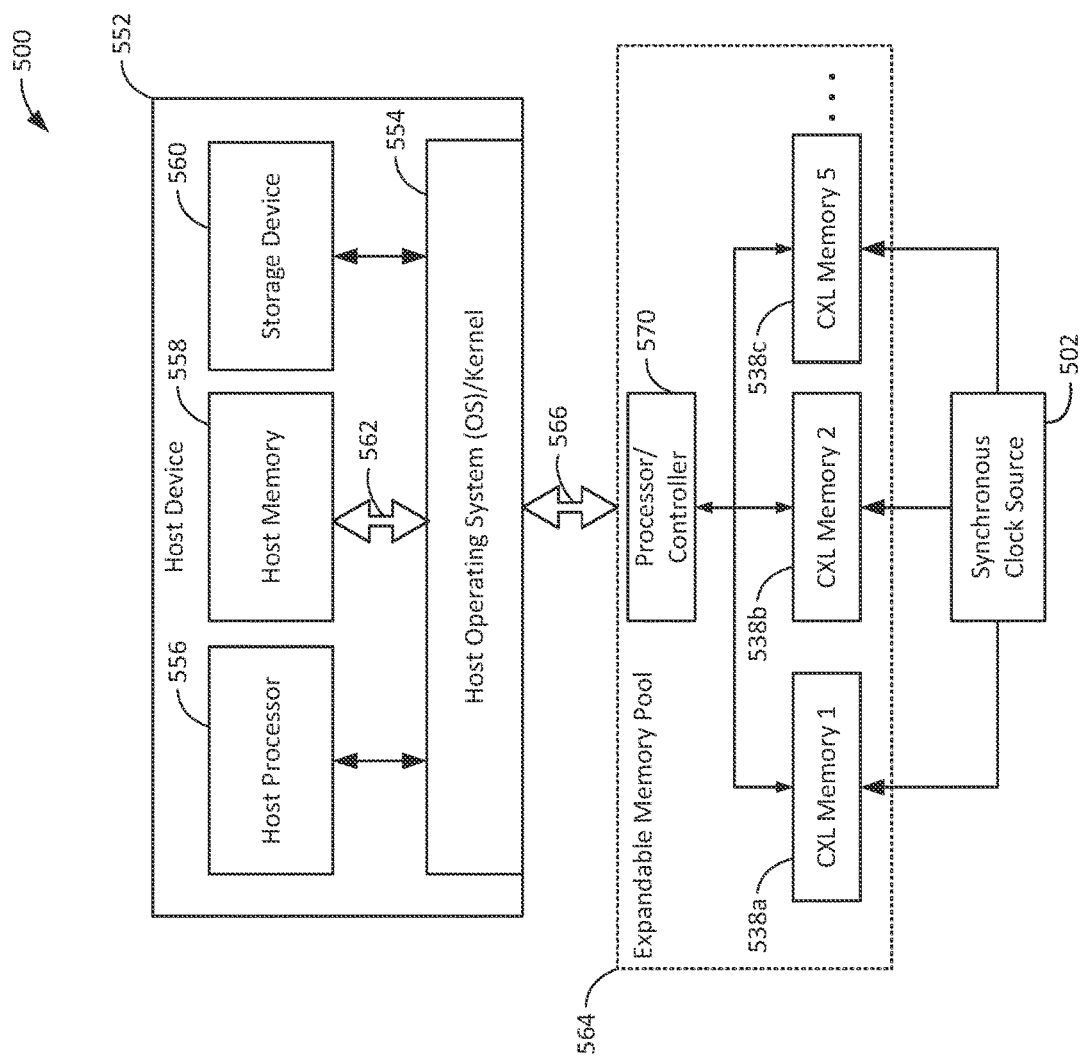
FIG. 5 is a schematic block diagram of an expandable memory pool in communication with a host processor according to one or more embodiments of the present disclosure.

FIG. 5 is a schematic block diagram of an expandable memory pool 564 in communication with a host processor according to one or more embodiments of the present disclosure.

Referring to FIG. 5, a host device 552 may include an operating system/kernel 554, a host processor 556, host memory 558, and a storage device 560. The operating system/kernel 554 may include system software to provide an interface between hardware and a user, and between software applications and the hardware. For example, the operating system/kernel 554 may be configured for resource allocation, memory management, CPU management, file management, execution of processes, and/or the like for the host device 552. For example, in some embodiments, the operating system/kernel 554 may include a Linux operating system/kernel, but the present disclosure is not limited thereto, and the operating system/kernel 554 may include any suitable operating system/kernel as would be known to those skilled in the art, such as a Windows OS, an Apple OS (e.g., macOS), a Chrome OS, and the like.

The host processor 556 may be a processing circuit, for example, such as a general-purpose processor or a central processing unit (CPU) core of the host device 552. The host processor 556 may be connected to other components via an address bus, a control bus, a data bus, and/or the like. The host processor 556 may execute instructions stored in the host memory 558 to perform the various operations described herein. For example, the host processor 556 may execute one or more system processes and background processes (which are described in more detail below), which may be copied from persistent storage (e.g., the storage device 560, read-only memory (ROM), and/or the like) to the host memory 558 as needed or desired (e.g., at startup, execution time, interrupt routine, and/or the like).

The host memory 558 may be considered as high performing main memory (e.g., primary memory) of the host device 552. For example, in some embodiments, the host memory 558 may include (or may be) volatile memory, such as dynamic random-access memory (DRAM) that may be directly connected to a memory slot of a motherboard of the host device 552 via a first memory interface 562. In this case, the first memory interface 562 (e.g., the connector and the protocol thereof) may include (or may conform to) dual in-line memory module (DIMM) to facilitate communications between the host memory 558 and the host processor 556 (e.g., via the host OS/kernel 554), such that the host memory 558 may be the DIMM memory connected to the DIMM slot of the host device 552. However, the present disclosure is not limited thereto, and the host memory 558 may include (or may be) any suitable high performing main memory (e.g., primary memory) replacement for the host device 552 as would be known to those skilled in the art. For example, in other embodiments, the host memory 558 may be relatively high performing non-volatile memory, such as NAND flash memory, Phase Change Memory (PCM), Resistive RAM, Spin-transfer Torque RAM (STTRAM), any suitable memory based on PCM technology, memristor technology, and/or resistive random access memory (Re-RAM), and may include, for example, chalcogenides, and/or the like.

The storage device 560 may be considered as secondary memory (e.g., secondary storage) that may persistently store data accessible by the host device 552. In this context, the storage device 560 may include (or may be) relatively slower memory when compared to the high performing main memory of the host memory 558. For example, in some embodiments, the storage device 560 may be a Solid-State Drive (SSD). However, the present disclosure is not limited thereto, and in other embodiments, the storage device 560 may include (or may be) any suitable storage device, for example, such as a magnetic storage device (e.g., a hard disk drive (HDD), and the like), an optical storage device (e.g., a Blu-ray disc drive, a compact disc (CD) drive, a digital versatile disc (DVD) drive, and the like), other kinds of flash memory devices (e.g., a USB flash drive, and the like), and/or the like. In various embodiments, the storage device 560 may conform to a large form factor standard (e.g., a 3.5-inch hard drive form-factor), a small form factor standard (e.g., a 2.5 inch hard drive form-factor), an M.2 form factor, an E1.S form factor, and/or the like. In other embodiments, the storage device 560 may conform to any suitable or desired derivative of these form factors.

The storage device 560 may be connected to the host processor 556 via a storage interface. The storage interface may facilitate communications (e.g., using a connector and a protocol) between the host processor 556 and the storage device 560 (e.g., via the host OS/kernel 554). In some embodiments, the storage interface may facilitate the exchange of storage requests and responses between the host processor 556 and the storage device 560. In some embodiments, the storage interface may facilitate data transfers by the storage device 560 to and from the host memory 558 of the host device 552. For example, in various embodiments, the storage interface (e.g., the connector and the protocol thereof) may include (or may conform to) Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), and/or the like. In other embodiments, the storage interface (e.g., the connector and the protocol thereof) may include (or may conform to) various general-purpose interfaces, for example, such as Ethernet, Universal Serial Bus (USB), and/or the like.

Still referring to FIG. 5, the host device 552 is connected to an expandable memory pool 564 via a second memory interface 566 different from the first memory interface 562. The expandable memory pool 564 may include one or more expandable memory devices 538a, 538b, 538c, for example, such as one or more compute express link (CXL) memory devices 538a, 538b, 538c. In some embodiments, the expandable memory pool 564 may be a disaggregated CXL memory pool including a plurality of different types of CXL memory devices 538a, 538b, 538c, which may typically include volatile memory such as DRAM, for example, from among DDR3, DDR4, DDR5, low-power, high-power, low-profile, PMEM, HBM, SSD with DRAM, and/or the like. However, the present disclosure is not limited thereto, and the expandable memory pool 564 may include (or may be) any suitable high performing expandable memory for the host device 552 as would be known to those skilled in the art, similar to the examples described above for the host memory 558.

In the illustrated embodiment of FIG. 5, the second memory interface 566 (e.g., the connector and the protocol thereof) may include (e.g., may conform to) a cache coherent protocol-based interconnect, such as a CXL interconnect, as part of a switching fabric. In some embodiments, the expandable memory pool 564 is a network attached expandable memory pool. In some such embodiments, the expandable memory pool 564 may be connected to the host device 552 via a processor/controller 570, which may include a network interface controller (NIC). The processor/controller 570 may include a memory pool controller (e.g., memory pool controller 336 of FIG. 3A), a heterogeneous processor (e.g., XPU 444 of FIG. 4) and/or the like. Further, the host device 552 may use the processor/controller 570 and a NIC to communicate with the expandable memory pool 564 over a suitable communications network (e.g., the Internet, a wide area network, a local area network, a cellular network, and/or the like).

In some embodiments, the second memory interface 566 (e.g., the connector and the protocol thereof) may include (e.g., may conform to) a cache coherent protocol-based interconnect, such as a CXL interconnect, built on a serial interface, such as periphery component interconnect express (PCIe), to facilitate communications between the host device 552 and the CXL memory devices 538a, 538b, 538c of the expandable memory pool 564 (e.g., via the host OS/kernel 554). In such embodiments, each of the CXL memory devices 538a, 538b, 538c may be connected to a PCIe slot of the host device 552 as a PCIe device.

To decrease latency between the CXL memory devices 538a, 538b, 538c and the latency between the host device 552 and the CXL memory devices 538a, 538b, 538c, the system 500 may also include the synchronous clock source 502. As discussed above, the synchronous clock source 502 may generate a synchronized clock signal that is supplied to each of the CXL memory devices 538a, 538b, 538c. The synchronized clock signal may ensure that the entire expandable memory pool 564 may be accessed as if the expandable memory pool 564 was a single memory device. In more detail, by using the synchronized clock signal, the need for clock data recovery (CDR) between the CXL memory devices 538a, 538b, 538c may be eliminated, and thus, the latency between the CXL memory devices may be decreased significantly, and the overall latency between the host device 552 and the expandable memory pool 564 may be reduced.

While FIG. 5 shows an example of one host device 552 connected to the expandable memory pool 564, the present disclosure is not limited thereto, and a plurality of host devices 552 may be connected to the expandable memory pool 564.

Figure 6:
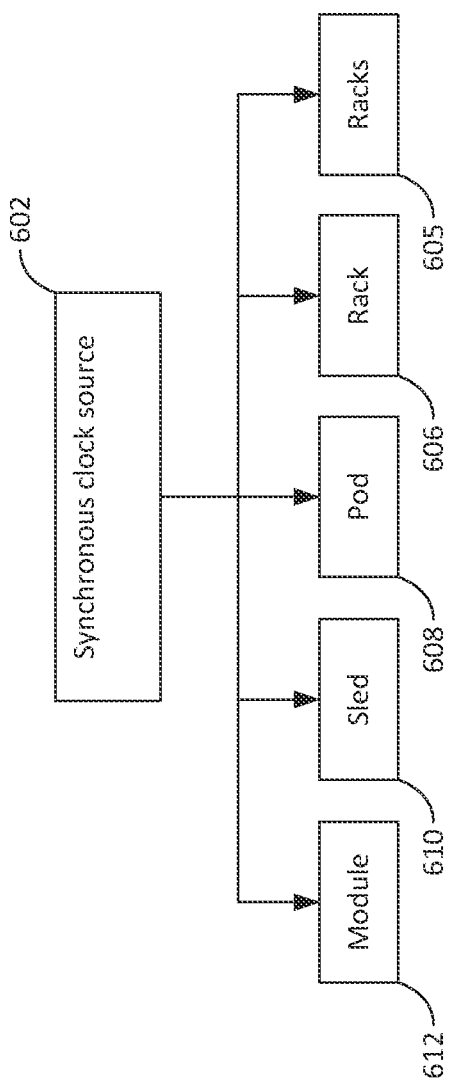
FIG. 6 is a schematic block diagram of a synchronous clock source interfacing with different forms of memory according to one or more embodiments of the present disclosure.

FIG. 6 is a schematic block diagram of a synchronous clock source interfacing with different forms of memory according to one or more embodiments of the present disclosure. As described above with reference to FIG. 1 and FIG. 2, the synchronous clock source 602 may connect with multiple different forms of memory including memory modules 612, memory sleds 610, memory pods 608, and memory racks 605, 606. Further, the synchronous clock source may reduce the latency of accessing each of the forms of memory when compared to not using a synchronous clock source. For example, when the synchronous clock source is not provided, each of the multiple different forms of memory may use or require clock data recovery in order to encode/decode the data, which may introduce latency into the system.

Accordingly, in some embodiments, each of the forms of memory may have a relatively predictable maximum latency associated with writing/accessing memory data within the form of memory, as latency associated with clock data recovery, which may vary depending on the form of memory, may be prevented or substantially reduced. In some embodiments, the predictable maximum latency may be within (e.g., less than or equal to) a predetermined threshold, for example, such as 1 microsecond. For example, in some embodiments, a maximum latency between a processor and a memory module 612 may be approximately 50 nanoseconds or less. In some embodiments, a maximum latency between a processor and a memory sled may be approximately 100 nanoseconds or less. In some embodiments, a maximum latency between a processor and a memory pod may be approximately 200 nanoseconds or less. In some embodiments, a maximum latency between a processor and a memory rack may be approximately 300 nanoseconds or less. In some embodiments, a maximum latency between a processor and multiple racks may be approximately 900 nanoseconds or less.

As would be appreciated by those having ordinary skill in the art, as the capacity of memory increases in each of the forms of memory, the latency also increases. Thus, in some embodiments, forms of memory may be variously grouped according to their predictable aggregated maximum latency and a desired maximum latency (e.g., based on a service level agreement SLA). For example, a first group of memory may include various memory modules, which have a relatively low latency. Further, a second group of memory may include various memory sleds, which have a higher latency than the memory modules. A third group of memory may include various memory pods, which have a higher latency than the memory sleds. A fourth group of memory may include individual memory racks, which may have a higher latency than the memory pods. A fifth group of memory may include multiple memory racks, which may have a higher latency than the individual memory racks. One or more host processors may request a desired group (e.g., a certain or predetermined group) of memory (e.g., through a service) that fulfills their memory requirements. For example, a host processor may request a group of memory that has a maximum latency within a threshold limit or may request a group of memory that has a desired (e.g., a certain or predetermined) memory capacity.

Figure 7:
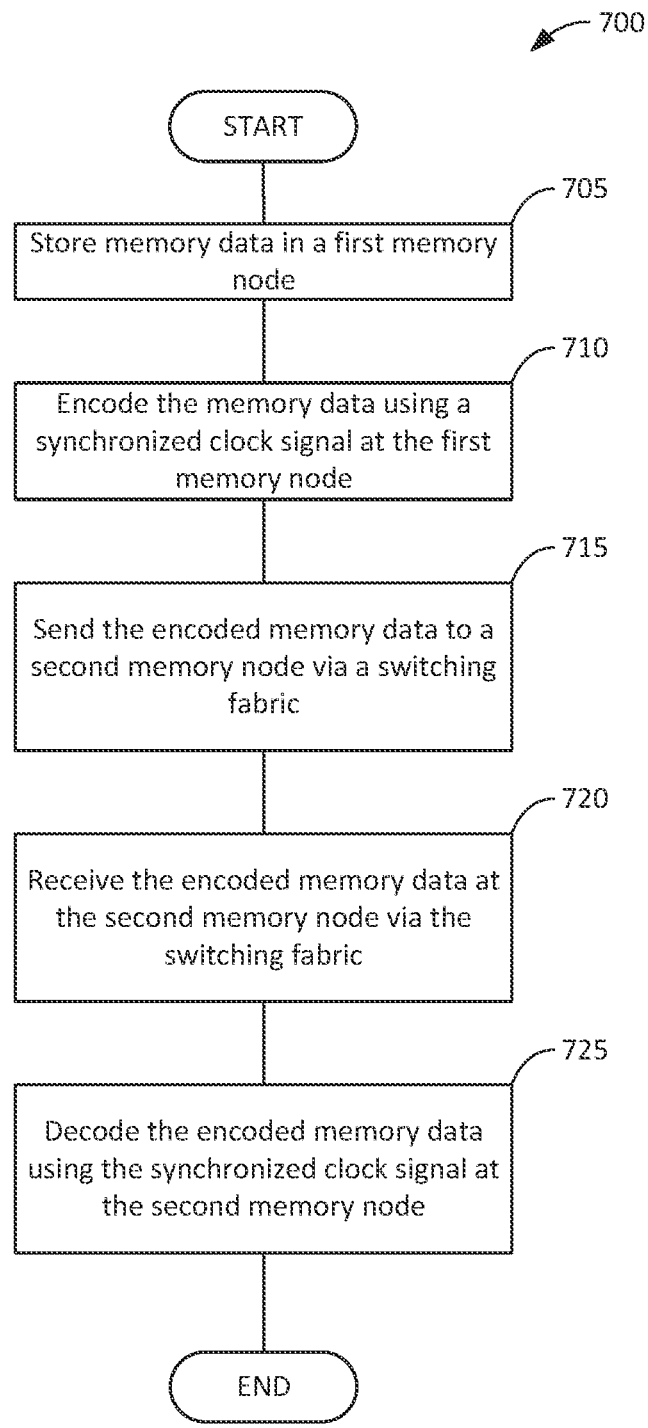
FIG. 7 is a flow diagram of a method of encoding and decoding data in memory nodes of a memory pool according to one or more embodiments of the present disclosure.

FIG. 7 is a flow diagram of a method of encoding and decoding data in memory nodes of a memory pool according to one or more embodiments of the present disclosure.

The method 700 may start, and memory data is stored in a first memory node at block 705. As described above with reference to FIG. 1, a memory node may include any suitable form of memory including a plurality of memory racks, an individual memory rack, one or more memory pods, one or more memory sleds, one or more memory modules, one or more memory dies, or one or more memory cells. Further, as described above with reference to FIG. 2, the memory node may include a memory controller and a link, in addition to the physical memory. At block 710, memory data is encoded using a synchronized clock signal at the first memory node. At block 715, the encoded memory data is sent to a second memory node via a switching fabric. In some embodiments, the switching fabric includes a compute express link (CXL) interconnect. At block 720, the encoded memory data is received at the second memory node via the switching fabric. At block 725, the encoded memory data is decoded using the synchronized clock signal (e.g., the same synchronized clock signal) at the second memory node, and the method 700 may end. The decoded memory data may then be retrieved (e.g., read) from the second memory node as needed or desired for further processing (e.g., by the host, the memory pool controller, the general processing unit, another memory node, and/or the like). In some embodiments, a system including at least a first memory node and a second memory node may perform the method of FIG. 7.

However, the present disclosure is not limited to the sequence or number of the operations of the method 700 shown in FIG. 7, and may be altered into any desired sequence or number of operations as recognized by a person having ordinary skill in the art. For example, in some embodiments, the order may vary, or the method 700 may include fewer or additional operations.

According to one or more embodiments of the present disclosure described above, a memory pool may include a first memory node and a second memory node with the first memory node connected to the second memory node over a switching fabric including a compute express line interconnect. According to one or more embodiments of the present disclosure described above, a synchronous clock source may be connected to the first memory node and the second memory node, with the synchronous clock source being configured to provide a synchronized clock signal to the first memory node and the second memory node. The first memory node and the second memory node may be configured to encode memory data and decode encoded memory data using the synchronized clock signal (e.g., the same synchronized clock signal, or in other words, the synchronized clock signal provided from the same synchronized clock source).

According to one or more embodiments of the present disclosure, because the first memory node and the second memory node use the same synchronized clock signal for both encoding and decoding, any communication between the first memory node and the second memory node may avoid performing clock data recovery to obtain an original clock signal. Accordingly, the latency of communications between the first memory node and the second memory node may be reduced. Further, computational resources and energy resources may similarly be reduced.

When a certain embodiment may be implemented differently, a specific process order may be different from the described order. For example, two consecutively described processes may be performed at the same or substantially at the same time or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer, or section. Thus, a first element, component, region, layer, or section described below could be termed a second element, component, region, layer, or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it may be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A system comprising:
a group of memory resources comprising a first memory node and a second memory node, the first memory node being connected to the second memory node over a switching fabric; and
a synchronous clock source connected to the first memory node and the second memory node, the synchronous clock source being configured to generate a synchronized clock signal based on a reference clock signal, and provide the synchronized clock signal to the first memory node and the second memory node to synchronize the first memory node with the second memory node,
wherein the first memory node and the second memory node are configured to encode memory data and decode encoded memory data using the synchronized clock signal received from the synchronized clock source.

2. The system of claim 1, wherein:
the first memory node comprises a first controller, the first controller being configured to encode the memory data using the synchronized clock signal, and transmit the encoded memory data to the second memory node; and
the second memory node comprises a second controller, the second controller being configured to receive the encoded memory data from the first memory node, and decode the encoded memory data using the synchronized clock signal.

3. The system of claim 1, further comprising a memory group controller connected to:
the first memory node and the second memory node via the switching fabric, the switching fabric comprising a cache coherent protocol-based interconnect; and
an input/output (I/O) connection,
wherein the memory group controller is configured to allocate memory from at least one of the first memory node or the second memory node by enabling communications between the I/O connection and the at least one of the first memory node or the second memory node.

4. The system of claim 1, further comprising:
a first processor connected to the first memory node and the second memory node of the group of memory resources via the switching fabric, and connected to a first network interface card (NIC); and
a second processor connected to a third memory node and a fourth memory node of the group of memory resources via a second switching fabric, and connected to a second NIC,
wherein the first processor is configured to communicate with the second processor through the first NIC or the second NIC.

5. The system of claim 4, wherein the first NIC is connected to the second NIC via a serial interface.

6. The system of claim 4, wherein the third memory node and the fourth memory node are configured to encode memory data and decode encoded memory data using the synchronized clock signal.

7. The system of claim 4, wherein the first processor comprises one of a system on chip (SoC), a central processing unit (CPU), a graphics processing unit (GPU), a tensor processing unit (TPU), a field-programmable gate array (FPGA), or an application-specific integrated circuit (ASIC).

8. The system of claim 1, wherein the first memory node comprises a first one of a memory die, a memory module, a memory sled, a memory pod, or a memory rack, and the second memory node comprises a second one of a memory die, a memory module, a memory sled, a memory pod, or a memory rack.

9. The system of claim 8, wherein the first memory node comprises a first memory rack and the second memory node comprises a second memory rack, the second memory rack being different from the first memory rack.

10. The system of claim 9, wherein a maximum latency between the first memory node and the second memory node is less than a predetermined threshold.

11. The system of claim 10, further comprising a processor in communication with a processor memory, the processor memory storing instructions that, when executed by the processor, cause the processor to run an application that stores information in the group of memory resources.

12. The system of claim 1, wherein the first memory node is further connected to the second memory node over a second switching fabric.

13. The system of claim 1, wherein the group of memory resources is cache coherent.

14. A system comprising:
a group of memory resources comprising:
a first memory node comprising a first memory controller, a first memory, and a first cache coherent protocol-based interconnect; and
a second memory node comprising a second memory controller, a second memory, and a second cache coherent protocol-based interconnect, the second memory node being connected to the first memory node over a switching fabric connecting the first cache coherent protocol-based interconnect with the second cache coherent protocol-based interconnect; and
a synchronous clock source connected to the first memory node and the second memory node, the synchronous clock source being configured to generate a synchronized clock signal based on a reference clock signal, and provide the synchronized clock signal to the first memory node at the first cache coherent protocol-based interconnect and to the second memory node at the second cache coherent protocol-based interconnect to synchronize the first memory node with the second memory node,
wherein the first memory node and the second memory node are configured to send and receive memory data to and from each other by encoding and decoding the memory data using the synchronized clock signal from the synchronous clock source.

15. The system of claim 14, wherein the first memory node and the second memory node are cache coherent.

16. The system of claim 14, wherein the first memory node and the second memory node are configured to encode and decode the memory data that is sent and received from each other using the synchronized clock signal.

17. The system of claim 14, wherein the synchronous clock source comprises:
a clock synthesizer comprising a phase-locked loop; and
a clock buffer.

18. The system of claim 17, wherein the clock buffer is connected to the first memory node at the first cache coherent protocol-based interconnect, and is connected to the second memory node at the second cache coherent protocol-based interconnect.

19. A method of encoding and decoding data in separate memory nodes of a group of memory resources, comprising:
storing memory data in a first memory node;
encoding the memory data using a synchronized clock signal at the first memory node, the synchronized clock signal being generated based on a reference clock signal;
sending the encoded memory data to a second memory node via a switching fabric;
receiving the encoded memory data at the second memory node via the switching fabric; and
decoding the encoded memory data using the synchronized clock signal at the second memory node, the synchronized clock signal at the second memory node being the synchronous clock signal used to encode the memory data at the first memory node.

20. The method of claim 19, wherein:
the switching fabric comprises a cache coherent protocol-based interconnect;
the first memory node comprises a first memory rack comprising a first plurality of memory devices; and
the second memory node comprises a second memory rack comprising a second plurality of memory devices.

* * * * *